(12) United States Patent
Trojer

(10) Patent No.: US 8,610,418 B2
(45) Date of Patent: Dec. 17, 2013

(54) METHOD AND APPARATUS FOR SUPPLYING POWER TO A CONNECTION DEVICE

(75) Inventor: Elmar Trojer, San Jose, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 43 days.

(21) Appl. No.: 12/904,477

(22) Filed: Oct. 14, 2010

(65) Prior Publication Data

US 2012/0091975 A1 Apr. 19, 2012

(51) Int. Cl.
*G05F 1/00* (2006.01)

(52) U.S. Cl.
USPC ........................................ 323/284

(58) Field of Classification Search
USPC ......... 323/282, 234, 265, 273–277, 284–285; 363/59
See application file for complete search history.

(56) References Cited

U.S. PATENT DOCUMENTS

| | | | |
|---|---|---|---|
| 6,680,839 B2* | 1/2004 | Napiorkowski | 361/119 |
| 2004/0000894 A1* | 1/2004 | Zhang | 323/225 |
| 2006/0176038 A1* | 8/2006 | Flatness et al. | 323/282 |
| 2007/0217101 A1* | 9/2007 | Carter et al. | 361/54 |
| 2009/0180302 A1* | 7/2009 | Kawabe et al. | 363/21.01 |
| 2009/0296301 A1* | 12/2009 | Casey | 361/119 |
| 2009/0300378 A1* | 12/2009 | Huang et al. | 713/300 |
| 2010/0046940 A1* | 2/2010 | Cotton et al. | 398/17 |
| 2010/0117808 A1* | 5/2010 | Karam | 340/310.16 |

* cited by examiner

*Primary Examiner* — Adolf Berhane
*Assistant Examiner* — Jeffrey Gblende

(57) ABSTRACT

Embodiments of the present invention a method and an apparatus for stabilizing power supply to a connection device, such as an ONU. The power is supplied via wires using DC voltage and the wires having a first conductor and a second conductor. The currents in the first conductor and in the second conductor are measured and if a difference between the currents is detected as being above a first threshold value the supplied DC voltage will be lowered. Within period of time since it was detected that the difference between the currents were above the first threshold value it is decided if the difference between the currents is diminishing faster than a rate threshold value. In response, the controller is configured to instruct the converter to increase the supplied DC voltage.

17 Claims, 6 Drawing Sheets

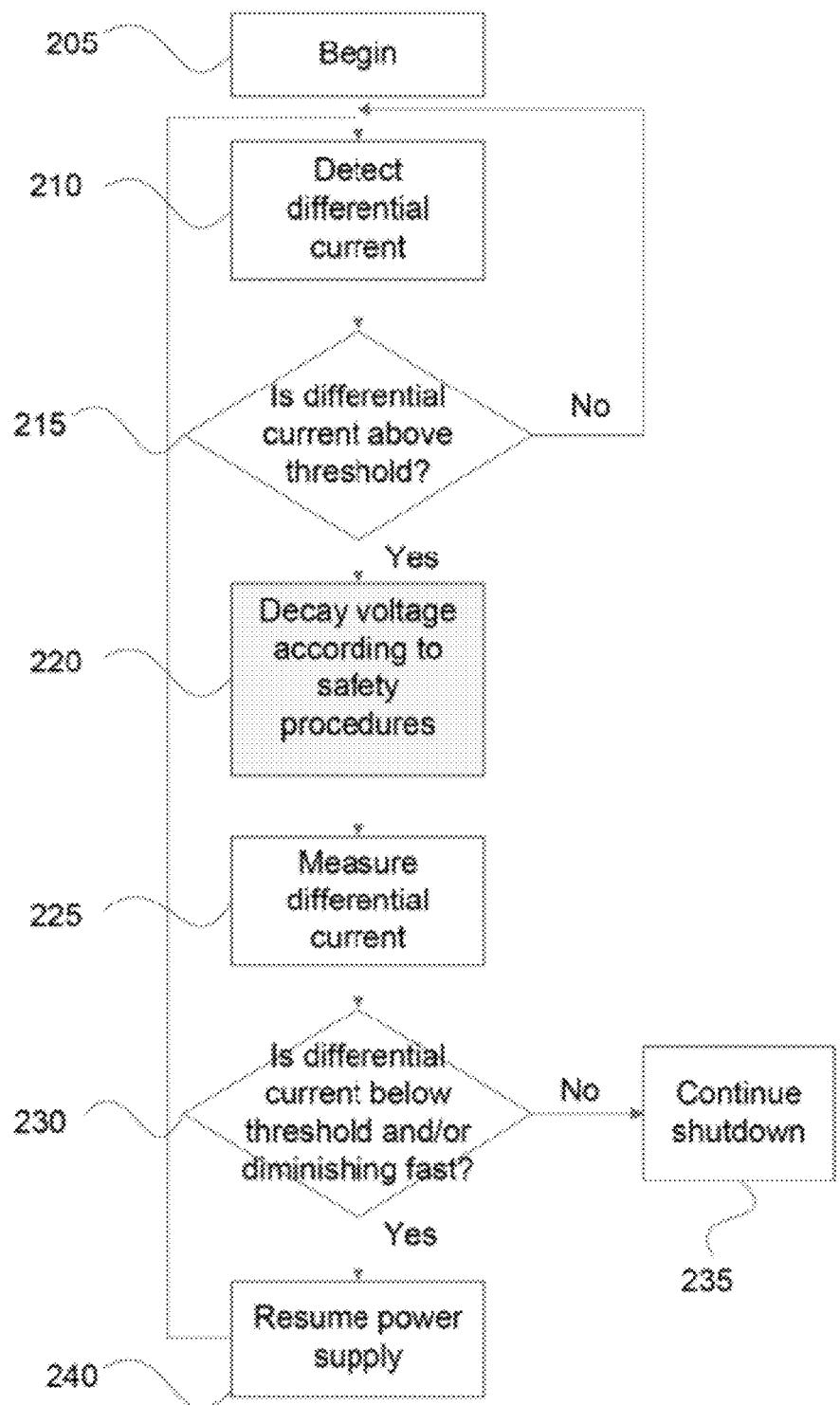

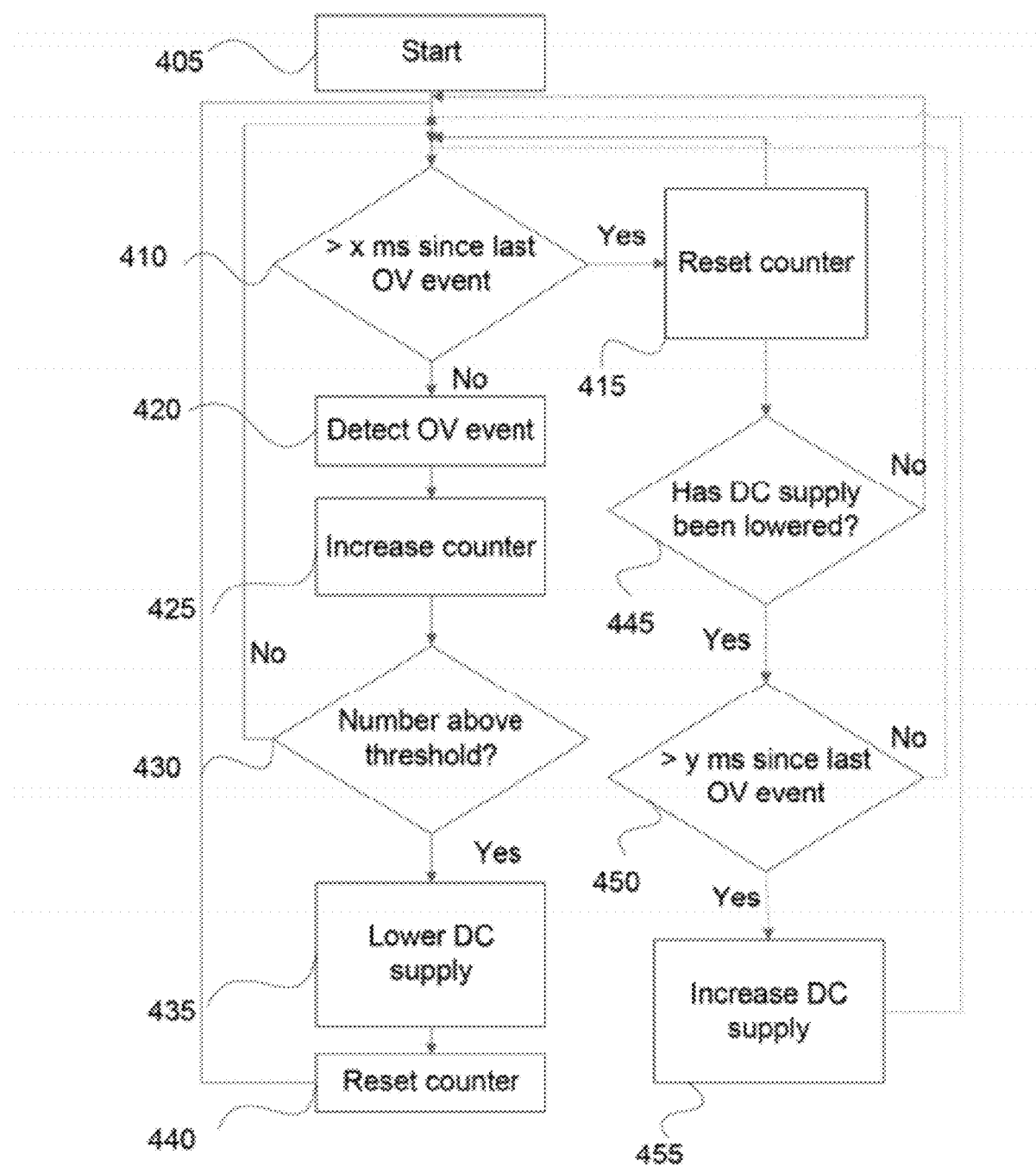

METHOD AND APPARATUS FOR SUPPLYING POWER TO A CONNECTION DEVICE

TECHNICAL FIELD

The present invention relates to a method and apparatus for stabilizing power supply to a connection device.

BACKGROUND

Fiber to the x (FTTx) is a generic term for broadband network architecture that uses optical fiber to replace the copper cabling usually used for connecting the network to the end user. E.g. fiber-to-the-building (FTTB) is a term that defines the scenario when fiber reaches the boundary of the building, such as the curb or basement in a commercial or residential building. The fiber is there connected to some kind of connection device where the final connection to the tenants is made via alternative means.

An Optical Network Unit (ONU) is an example of such a connection device. When installed close to, or in, a commercial or residential building the connection device is often referred to as a Multi-Dwelling Unit (MDU). The ONU delivers services over Very-high-speed Digital Subscriber Line (VDSL2) or Ethernet from a Giga-bit or Ethernet Passive Optical Network (GPON or EPON) feed. The services are provided to the ONU via a fiber connection coming from an access node (OLT—Optical Line Termination) in a central office. The ONU converts the optical signals in the optical fiber to electrical signals for delivery to the tenants. The ONU is not powered locally, but retrieves power from a remote power station in a remote terminal (RT) that can be located far away. The powering is provided via already existing twisted pair telephone copper from the RT to the ONU. The twisted pair telephone copper was once being used for Plain Old Telephone Service (POTS) and later for Asymmetric Digital Subscriber Line (ADSL) containing POTS. Due to the small wire gauge of the twisted pair telephone copper the power supply in the RT must deliver the power using high DC voltage since the use of low DC or AC voltage would result in high losses. The RT may therefore up-convert −48V (which is the typical operating voltage of the RT) to +/−190V which is necessary to deliver enough power (~95 W per power channel, 380V, 250 mA max) to the ONU. Depending on power consumption and distance, one or two power pairs are typically utilized. Accordingly, the ONU down-converts +/−190V to −48V to power internal electronics. The RT may be placed in the central office or in another location where access to the AC power grid is available.

To protect the RT and ONU equipment from surges during lightning, primary (gas discharge tubes) and secondary (si-dactors) protection mechanisms are deployed in both the RT and the ONU, effectively shortening power leads to ground, bleeding surge energy off. This causes power outages in the area of tens of milliseconds that leads to service unavailability for users. Therefore, hold-over capability in form of an inexpensive hold-over circuit containing low-lost and low-value capacitors may be installed at the ONU to power the device during the short time period of power loss from the remote up-converter.

When a ground fault is detected on the power leads, the up-converter performs a safety power shutdown of the RT for between 60 milliseconds to several seconds according to safety standards. This results in loss of power from the up-converter of the RT to the ONU. For economic reasons an ONU should preferably not be provided with any expensive hold-over capability of several seconds such as ultra-capacitors, batteries, etc. Consequently, a ground fault leads to a reboot of the ONU leading to service outage to all costumers of the ONU for some minutes.

Ground faults do not occur frequently since they are introduced by safety breaches caused by humans or animals touching the leads or power crossover. However, the poorly shielded and aged telephone copper that feeds from RT to the ONU can be very sensitive to external disturbances such as interferences from close-by power distribution and transmission lines causing common mode transients which result in current imbalance. Sometimes the up-converter misinterprets these disturbances as ground fault events causing unnecessary safety power shut downs.

There is thus a need for a method and an apparatus that is resilient to interferences but still complies with existing safety standards.

SUMMARY

An object of the present invention is therefore to provide an apparatus having a stable power supply to a connection device, such as an ONU. The apparatus is configured to supply power to the connection device via telephone wires using DC voltage. The wires include a first conductor, such as a ring conductor, and a second conductor, such as a tip conductor. The apparatus comprises a converter being configured to increase the DC voltage to be supplied to the wires and a detector, e.g. sensor resistors, that is configured to measure the currents in the first conductor and in the second conductor. The apparatus further comprises a controller, such as a central processing unit, that is configured to detect if a difference between the first and second conductor currents is above a first threshold value, e.g. 25 mA. If so, the controller is configured to instruct the converter to start lowering the supplied DC voltage and then continue to measure the first and second conductor currents.

Within a set period of time, e.g. 5 ms, since it was detected that the difference between the currents were above the first threshold value the controller is configured to decide if the difference between the currents fulfill certain criteria; This means that the controller is configured to decide if the difference between the currents are below a second threshold value, e.g. also 25 mA, and/or if the difference between the currents is diminishing faster than a rate threshold value. If any or both criteria are fulfilled the controller is configured to instruct the converter to increase the supplied DC voltage.

Advantages with such an apparatus are that it is resistant to external disturbances such as interferences from close-by power distribution and transmission lines causing current imbalance and common mode transients.

The present invention is also directed to a method for stabilizing power supply from a Remote Terminal (RT) to a connection device, such as an ONU. The power being supplied to the connection device via telephone wires using DC voltage. The wires include a first conductor, such as a ring conductor, and a second conductor, such as a tip conductor. The method measures the currents in the first and second conductors, and if a difference between the currents is detected as being above a first threshold value (e.g. 25 mA) the supplied DC voltage will be lowered.

Despite the instruction to lower the supplied DC voltage the currents in the first conductor and in the second conductor are continuously measured. Within a set period of time, e.g. 5 ms, since it was detected that the difference between the currents were above the first threshold value it is decided if the difference between the currents fulfill certain criteria. This means that it is decided if the difference between the currents are below a second threshold value, e.g. also 25 mA, and/or if the difference between the currents is diminishing faster than a rate threshold value. If any or both criteria are fulfilled the supplied DC voltage will be increased to the value it had previous to the detection of the difference between the currents.

An advantage with this method is that it is resistant to external disturbances such as interferences from close-by power distribution and transmission lines causing current imbalance and common mode transients.

BRIEF DESCRIPTION OF THE DRAWINGS

Reference will now be made, by way of example, to the accompanying drawings, in which:

FIG. 4 is a flow chart schematically illustrating a method for maintaining the power supply to a telecommunications unit in accordance with an alternative embodiment of the present invention.

DETAILED DESCRIPTION

An approach to stabilizing the power supply to a connection device when the power is supplied to the connection device via a pair of telephone wires or similar is presented here. In the following it is assumed that connection devices are telecommunication units such as an ONU or an MDU, although the approach is equally applicable to other remote powered devices.

Figure 1:
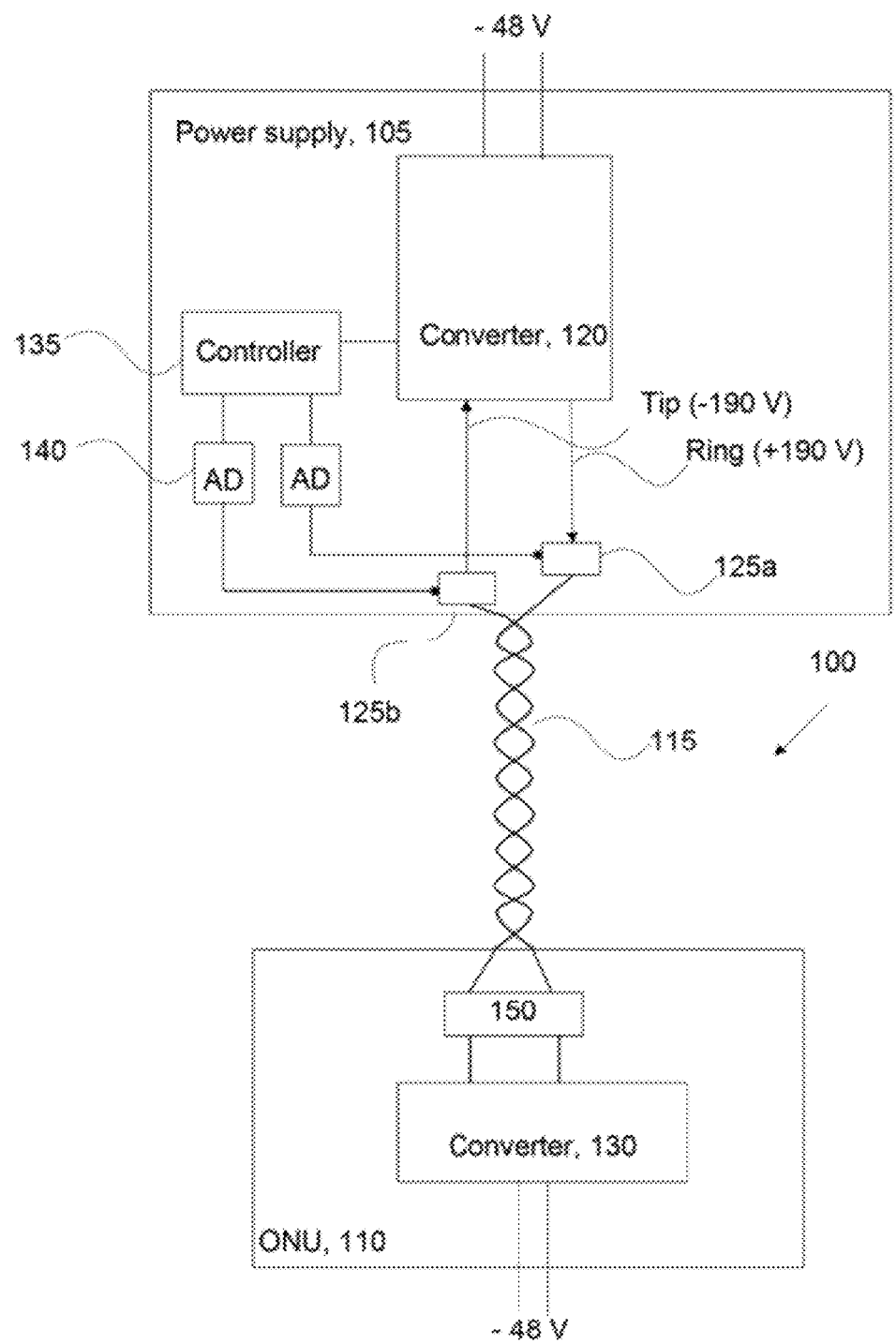
FIG. 1 schematically illustrates a block diagram showing a system, including a remote power supply and a telecommunications unit, in accordance with the present invention.

FIG. 1 schematically illustrates an overview of a system 100 where power is supplied from a power supply 105 to a telecommunication unit 110. The power is supplied via a pair of telephone wires 115.

The power supply 105 includes an up-converter 120 and two detectors 125a, 125b. An up-converter is a power converter with an output DC voltage greater than its input DC voltage. In this example the up-converter 120 converts −48 V, which is the usual voltage in a central office, to +/−190 V.

In the telecommunication unit 110 the corresponding conversion from +/−190 V to −48 V is performed by a down-converter 130 in order to power internal electronics. The telecommunication unit may also be provided with some form of hold-over capability 150, e.g. in the form of one or more capacitors or batteries.

The telephone wires 115 is twisted pair telephone copper from the power supply 105 to the telecommunication unit 110. Before the telecommunication unit 110 was connected to the fiber network, the wires 115 were used for providing xDSL and POTS to the telecommunication unit from a central office. The wires 115 are provided with a first conductor (a positive ring conductor +190V) and a second conductor (a negative tip conductor −190V) operating at 380V DC.

The detectors 125a-b are connected to the ring and the tip respectively. Even though the detectors 125a-b are shown as two separate boxes in the figure, these can be included in just one box. The detectors 125a-b measure the current passing through the conductors.

The detectors are further arranged to detect when a significant difference in current between the two conductors takes place. If the difference is larger than a threshold, e.g. 20 or 25 mA, it is a sign that a ground fault or some other disturbance has occurred. The detector then reports the event to a controller, such as a central processing unit (CPU) 135 that immediately instructs the up-converter 120 to decay the voltage outputted on the wires 115.

The up-converter 120 converts incoming low DC voltage −48V to +/−190V voltages to be transported with low loss over the old copper pair. The −48V are generated from AC voltage (110V/60 Hz in the US and 230V/50 Hz in Europe) by a rectifier power supply connected to the up-converter. The high voltage difference of 380V is causing a low current (<250 mA) which limits the power loss in the small-diameter twisted pair copper wire. Supplying 250 mA at 380V delivers a maximum of 95 W (380V*0.25 A) to the ONU which is enough to power GPON/VDSL2 equipment. If more power is needed, several power channels can be used in parallel, e.g. two channels can be used for long-reach (6 km), or one single pair can be used for 3 km reach.

Between the up-converter 120 and the telephone wires 115 two detectors 125a, 125b in the form of sensor resistors are provided which measure the leaving and returning currents. The sensor resistors are very small not to loose too much power over the resistors, preferably in the area of some Ohms (typically 5 Ohms). With a maximum current of 250 mA over a 4 Ohm resistor gives a span of 0-1V. An analog/digital converter 140 per conductor (tip and ring) transform the analog voltage over the resistors proportional to the current (U=R*I) to a digital value that is sampled by a controller 135 to perform safety checks such as for ground-fault events or over-voltage events. If such an event is determined—as per safety standards—the controller 135 would switch the DC/DC up-converter 120 off using pulse width modulation (PWM) for some time, which would cause an outage of an ONU that is not provided with hold-over capability.

The units that have been described may include additional components that are usually provided in such units.

Figure 2:
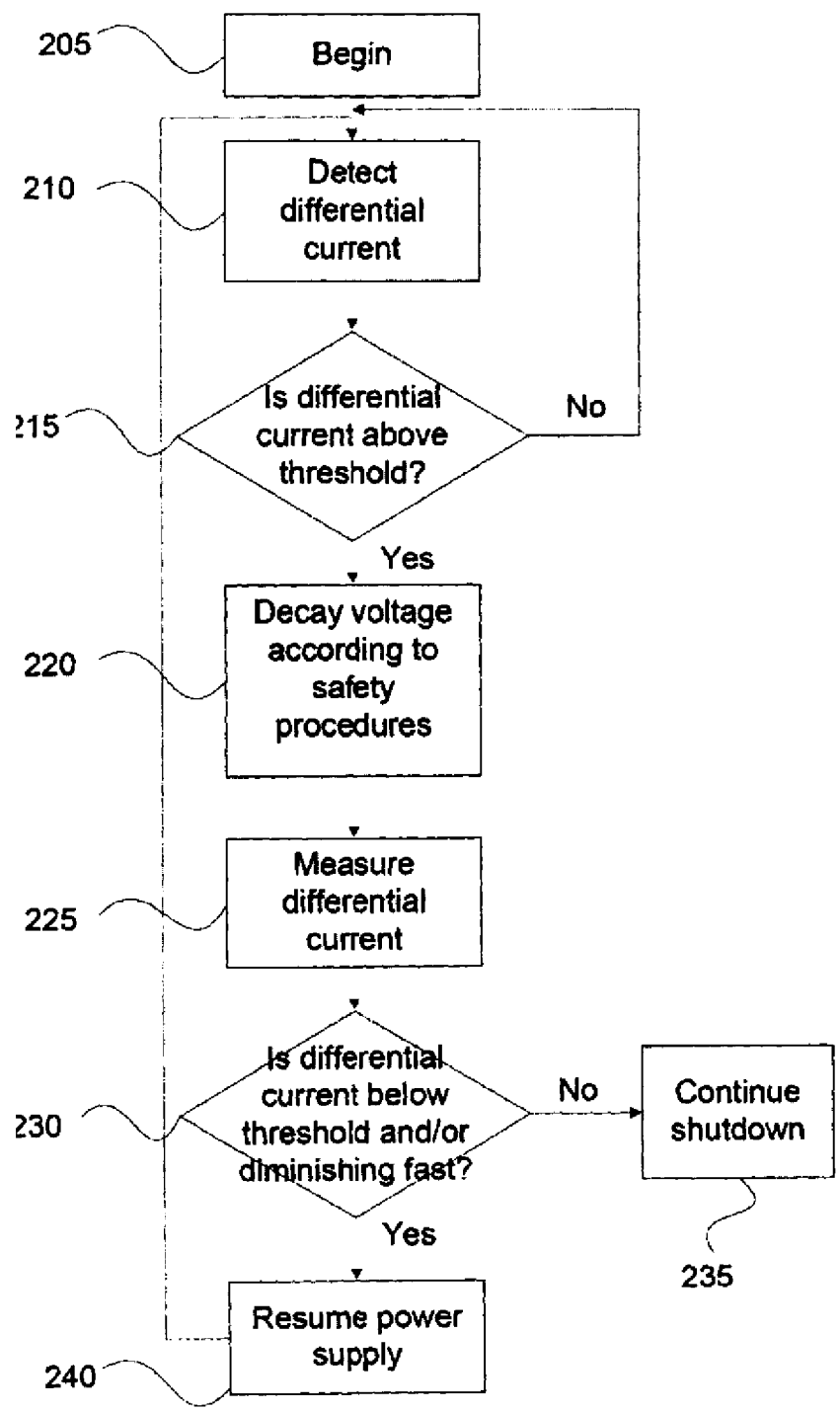
FIG. 2 is a flow chart schematically illustrating a method for maintaining the power supply to a telecommunications unit in accordance with the present invention.

FIG. 2 is a flow chart schematically illustrating a method for maintaining the power supply to a telecommunications unit in accordance with the present invention.

The method is performed by/in a remote terminal providing power supply to a telecommunications unit. After start 205 of the method, a differential current between tip and ring is detected in step 210. A detected differential current indicates that something has interfered the transmission either in the form of a ground fault or an external disturbance. In step 215 it is checked whether the differential current is above a determined first threshold value, e.g. being above 25 mA. Preferably the first threshold value is chosen from the interval 20-30 mA, which is enough to give a clear indication of a fault and at the same time not resulting in a too sensitive system. If the detected differential current is below the threshold according to alternative "No", the method returns to step 210 where the current is continued to be detected. If the detected differential current is above the threshold according to alternative "Yes", the method continues with step 220 where the controller 135 instructs the up-converter 120 to decay the voltage submitted on the telephone wires 115.

Measurements show however that the differential current often is due to interferences that mostly depend on common mode pulses being large in amplitude (between 50 V and 200 V), as long as 2-4 ms and mostly repetitive. These pulses may trick the up-converter into a ground fault condition which effectively switches the power supply off for cycles of 60 ms followed by seconds of outages (up to 5 seconds) according to safety standards. Without expensive hold-over solutions at the ONU, the ONU will accordingly be shut down.

In step 225 the differential current therefore continues to be measured despite the instruction from the controller 135 to immediately start decreasing the output voltage of the up-converter 120. The differential current can e.g. be continuously measured during 1-10 ms. In the step 230 it is checked whether the differential current is below a determined second threshold value, e.g. being below 25 mA which was the (first) threshold value chosen in step 215. Preferably the second threshold value is also chosen from the interval 20-30 mA. The threshold values chosen in steps 215 and 230 can thus be the same or they can be different. If, in accordance with step 230, after a set period of time chosen from the interval 1-10 ms, e.g. 5 ms, it is determined that the current is above the threshold value according to alternative "No", it is highly likely that the differential current is due to a ground fault and the shutdown begun in step 220 is continued in step 235. A ground-fault event is thus declared if the current difference $|I_{out}|-|I_{return}|$ (i.e. ring current minus tip current) is larger than 25 mA indicating that current is drained to ground somewhere in the outside network (such as when a human is touching a wire or wires get shorted).

However, if it within this period of time is determined that the current is below the threshold value according to alternative "Yes", it can be concluded that the differential current originates from an external disturbance rather than a ground fault and the controller will in step 240 instruct the up-converter to resume the power supply and increase the voltage to the value previous to step 220. In case of a ground fault the differential current would not be converging in such a manner that the difference in currents are below the threshold value (25 mA) within as short period of time as 5 ms.

However, in order to be certain that the low differential current value is not a coincidence; further measurements can be made during a period of a few milliseconds more. Either the method can continue with step 240 before these further measurements and thus the power supply will be increased as soon as the differential current is below the threshold value and then later to be decayed if the further measurements indicate that the threshold is exceeded. Alternatively the result from these further measurements can be awaited before the method continues with step 240.

According to an alternative embodiment of step 230, the differential current can be measured during a period of time in order to study its behaviour. If the measurements show that the differential current is diminishing at a certain rate, it can be correspondingly determined that the differential current originate from an external disturbance rather than a ground fault and the controller will in step 240 instruct the up-converter to resume the power supply and increase the voltage to the value previous to step 220.

The diminishing rate of the differential current can be made as follows. The differential current is specified as $dI=|I_{out}-I_{return}|$. dI is then measured at different time points e.g. t1, t2 and t3, i.e. 3 time points each being dT=1 ms apart. The measurements would then be dI is dI(t1), dI(t2=t1+dT) and dI(t3=t1+2dT). The diminishing rate can thus be computed as [dI(t2)−dI(t1)]/dT and [dI(t3)−dI(t2)]/dT and if these values are above defined rate threshold values, e.g. 10 mA/1 ms, then it can be concluded that the differential current is due to a non-ground-fault event. Measuring the rate for the decrease of the differential current demands more processing capability from the controller, but may result in a quicker determination concerning the origin of the differential current since the determination can be done before the differential current is below the previously discussed threshold value. I.e. the set period of time between the detection of the differential current being above the threshold value in step 215 and the decision to resume the power supply in step 240 can be shortened.

According to a further alternative embodiment of step 230, a combination of both the value of the differential current and the diminishing rate of the differential current can be used for determining the origin of the differential current. In this way a quick as well as reliable determination can be made.

The capability to distinguish if the differential current is because of a true ground-fault or a ground-fault that was introduced by external interference, allows the usage of a cheap hold-over solution at the ONU which is able to hold over for 100 ms instead of seconds. If the ground-fault was caused by an interference, the power will only be switched-off for milliseconds instead of several seconds as indicated by safety standards. This makes expensive hold-over solutions at the ONU unnecessary. By choosing the set period of time before making the decision in step 235 from the interval 1-10 ms, means that cheap hold-over solutions at the ONU is sufficient at the same time as any incorrect decision is avoided, especially if the interval is chosen from 3-10 ms, e.g. 5 ms.

Figure 3A:
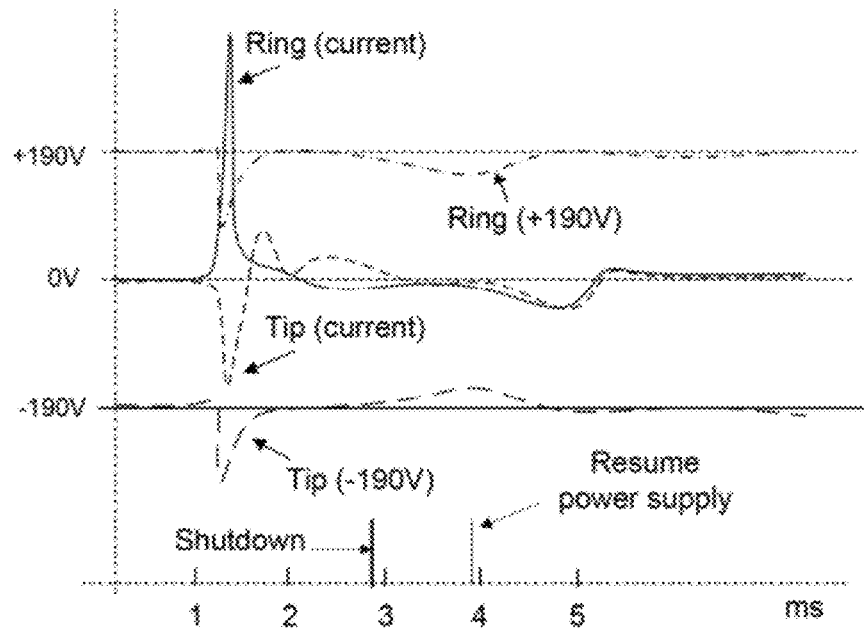
FIG. 3a is a diagram schematically illustrating e.g. how the currents measured at the ring and tip conductors varies with the introduction of a common mode pulse.

FIG. 3a is a diagram schematically illustrating e.g. how the currents measured at the ring and tip conductors varies with the introduction of a common mode pulse. In this example a common mode pulse is introduced to ring (+190V) and tip (−190V), whereby the up-converter starts to decay the voltage according to safety standards. As can be seen a pulse with negative sign (≈−100 V) was introduced after approximately 1 ms and the ring and tip voltages dips accordingly. At normal operation the ring and tip conductors have the same measured current, but once the pulse hits, the currents measured by the detectors 125a-b clearly diverge. The ring current immediately goes up about 200 mA while the tip current dips almost 100 mA from the normal ring and tip currents respectively, which in this example are about 250 mA. However, as can be seen in the figure the differential current returns to zero very quickly. Already 1 ms after the hit of the pulse the differential current is almost zero, even though the value still varies a bit for another millisecond until it stabilizes. In this example the controller 135 instructs the up-converter 120 to resume the power supply already approximately 1 ms after the up-converter started to decay the voltage ("shutdown" in figure) and approximately 3 ms after the hit of the pulse.

The supply is thus started quickly up again without long outage (quick starting), and only causes a power loss in the ONU of a time period approximately equal to the length of the pulse. This is normally in the area of 1-5 ms and can be easily held over by a small capacitance at the ONU side.

Figure 3B:
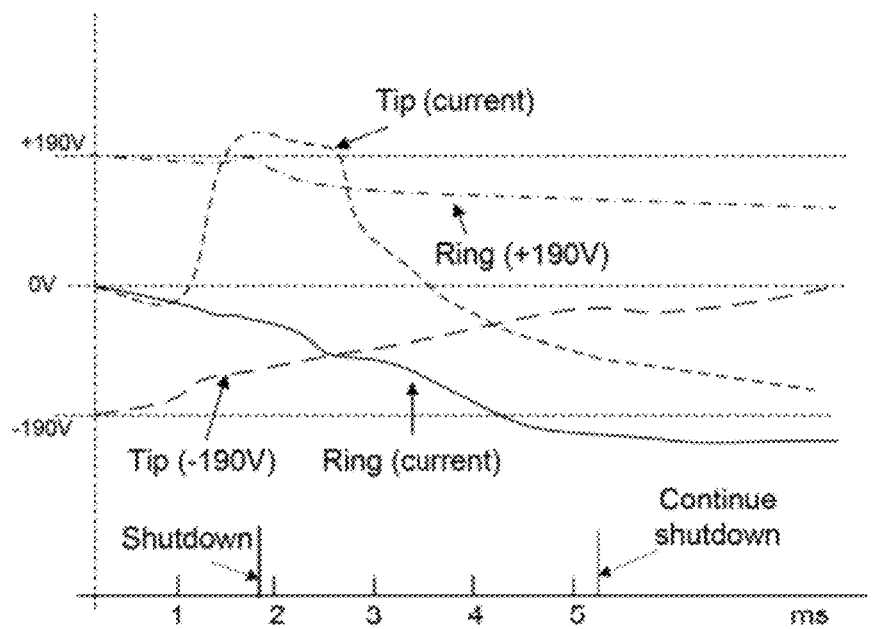
FIG. 3b is a diagram schematically illustrating e.g. how the currents measured at the ring and tip conductors varies in a ground fault situation.

FIG. 3b is a diagram schematically illustrating e.g. how the currents measured at the ring and tip conductors varies in a ground fault situation. In this example the differential current is due to a real ground fault. As can be seen the differential current persist. Even though a slight convergence can be seen, the difference between the currents is approximately 100 mA when 4 ms have passed since the detection of the differential current. This determines that the differential current is due to a real ground fault and the shutdown is continued. The period of time between the detection of the differential current being above the first threshold value and the decision to continue shutdown is thus in this example set to approximately 4 ms. Meaning that if it is not decided that the differential current diminishes faster than a set rate threshold value and/or that the differential current is below a threshold value within this period of time, it is decided not to take measures and thus to continue shutdown.

FIG. 4 is a flow chart schematically illustrating a method for maintaining the power supply to a telecommunications unit in accordance with an alternative embodiment of the present invention. The flow chart describes the procedure of handling the situation when over-voltage events occur. An over-voltage event is declared if the voltage on either ring or tip is exceeding 200V (10V over the nominal 190V) for a couple of times. External interference introduces high amplitude voltage transients which the up-converter senses as an over-voltage condition. The up-converter has to keep the output voltage within a standardized limit (+/−200V for +/−190V nominal voltage) and shut down if the voltage rises higher due to an internal fault in the up-converter front-end. The controller 135 is therefore counting the number of crossing-events and if it exceeds a pre-configured value, the power is switched off. See also FIGS. 5a, 5b and 5c which all show over-voltage events where each event is illustrated by a number.

The method is performed by/in a remote terminal providing power supply to a telecommunications unit. After start 405 of the method, the detectors 125a-b measure the ring and tip voltages and are sensitive to over-voltage events. The method includes a check concerning the time since the last over-voltage took place in step 410. This check takes place continuously and if the time exceeds a predetermined period of time without over-voltage events, such as e.g. 500 ms, according to alternative "Yes", the counter keeping track of the number of over-voltage events is cleared in step 415. The clearing of the counter in step 415 may be followed by some further steps which will be described later. In case the predetermined period of time without over-voltage events is not exceeded according to alternative "No", the method continues with step 420 where over-voltage events are detected. In step 425 a counter in the controller 135 registers the detected over-voltage event and increases the counter value by one. In step 430 it is checked whether the counter value is above a predetermined number, such as 10; or e.g. 20 if lower sensitivity is wanted. In case the new counter value is less than the predetermined number of over-voltage events according to alternative "No", the method continues with step 410. In case the new counter value is above the predetermined number according to alternative "Yes", this will trigger the controller 135 to instruct the up-converter 120 to start lowering its DC supply to the ONU 110 in step 435. When the supplied DC voltage is lowered, either completely shut down or lowered to a set value e.g. 165 V, the counter value is preferably reset in step 440.

It should be mentioned that the counter does not necessarily start counting from 0 and up, but could e.g. start at a set integer value and count downwards.

According to an alternative embodiment of the invention, when the DC voltage is lowered in step 435, the new DC voltage is set to a fix lower level, being approximately 10-20% lower than the initial DC voltage level such as e.g. 165 V. This means more headroom in terms of voltage will be gained and subsequent pulses may not cross the 200 V threshold and cause the counter to increase. Thereby these pulses originating from interferences will not cause a power shutdown of the power supply.

In case it is determined in step 410 that the predetermined period of time without over-voltage events is exceeded, the counter will be reset in step 415. If the method includes that the DC supply is shut down in step 435 the method can continue directly to step 410 and 420 with continuing to detect over-voltage events. In case the DC supply in step 435 is lowered to a set value instead of shutting down the DC supply, the resetting of the counter may be followed by steps 445-455. In step 445 it is checked whether the DC voltage has been lowered. If not, the method can continue directly to step 410 and 420. If the DC voltage has been lowered in a previous step 435, it is checked in step 450 whether a predetermined period of time has passed since the last detection of an over-voltage event. This period of time can be e.g. a couple of seconds. If more than this predefined time has passed according to alternative "Yes", it can be an indication that the DC voltage can be increased, which is done in step 455 after which the method continues with steps 410 and 420. If the answer in step 450 is "no" the method can accordingly continue directly to step 410 and 420.

Figure 5A:
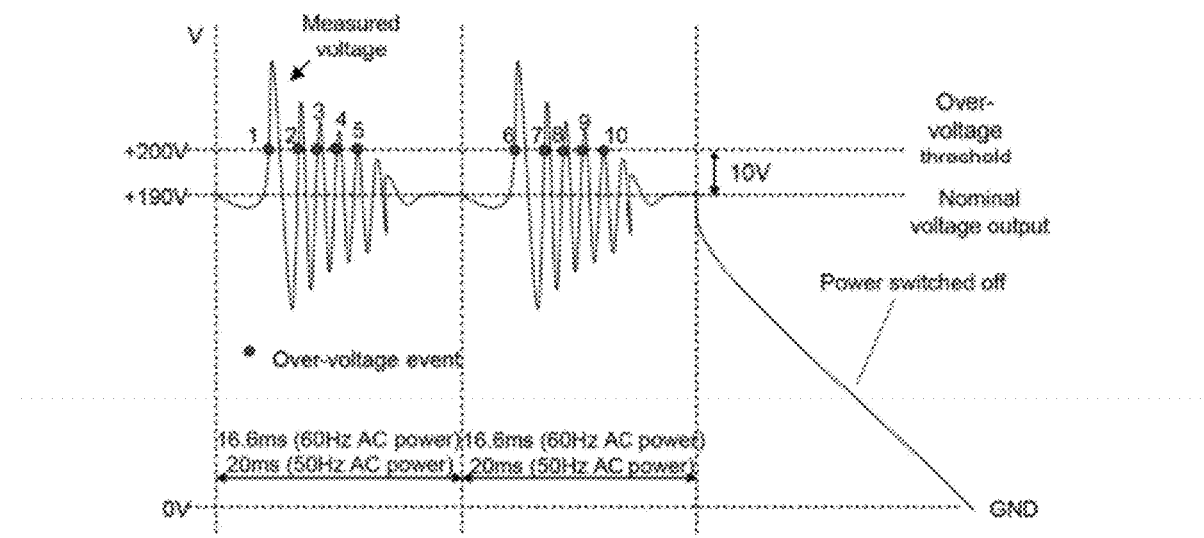
FIGS. 5a-c are diagrams schematically illustrating how the DC voltage measured at the ring conductor varies with the introduction of external pulses and the detection of over-voltage events.
Figure 5B:
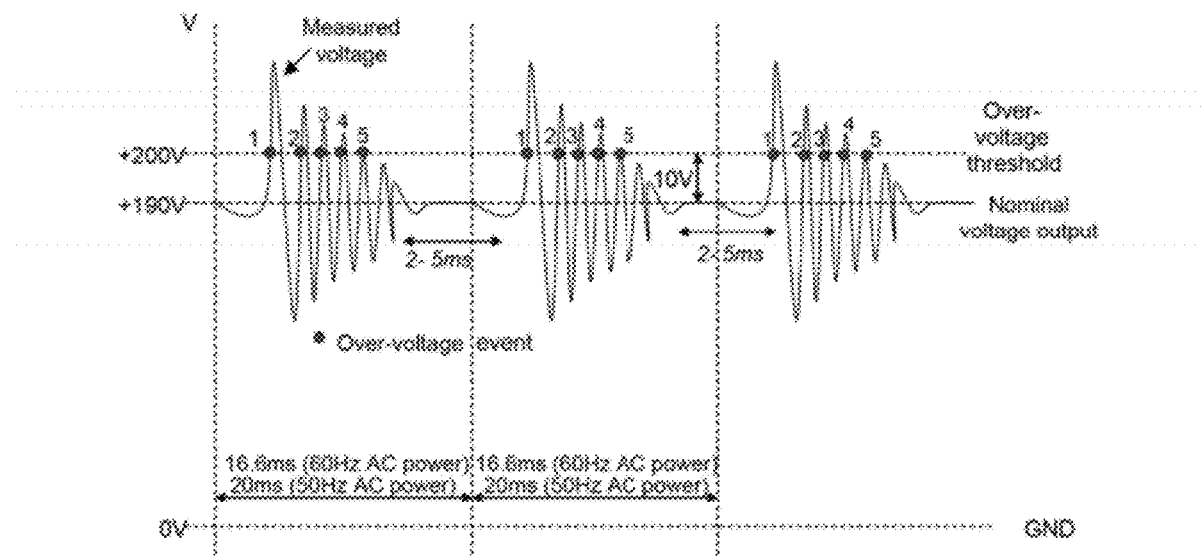
Figure 5C:
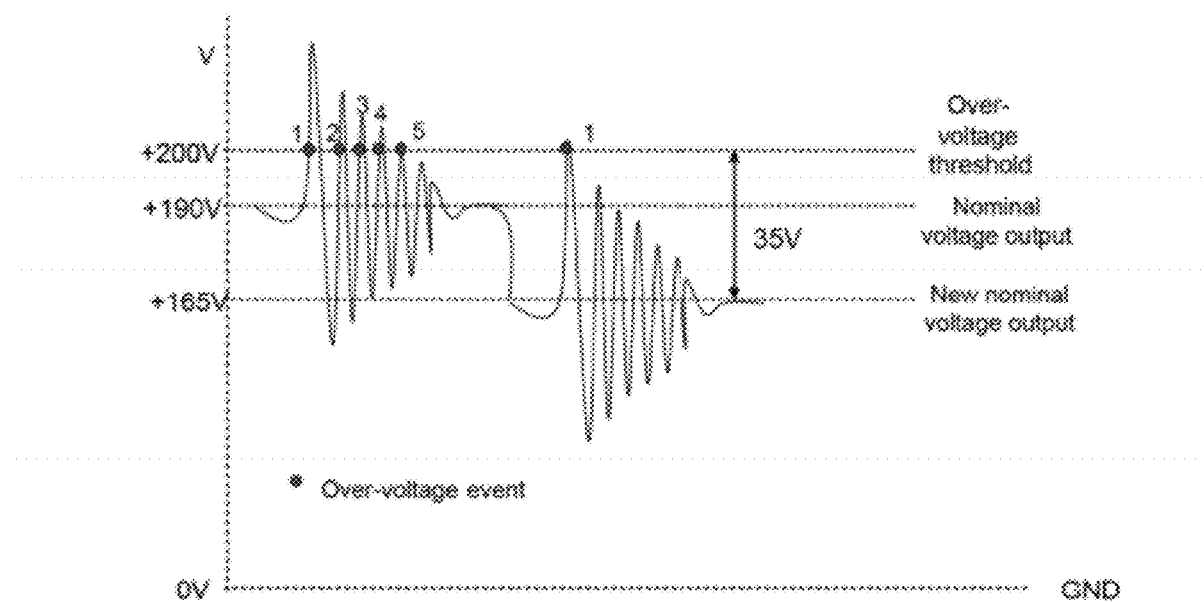

FIGS. 5a-c are diagrams schematically illustrating how the DC voltage measured at the ring conductor varies with the introduction of external pulses and the detection of over-voltage events. The figures show typical pulses originating from interferences found on the wires 115. The pulses are repeated with an interval of 16 ms (derived from 60 Hz AC voltage) and having a so called "swing-out" in amplitude, i.e. an attenuated ringing pulse. Each time +200V or −200V are crossed (ring and tip respectively) an over-voltage event is counted. If the counter reaches 10, as shown in FIG. 5a, the power is shut down for 4 seconds which causes the ONU to go down. High-energetic pulses (low decay in ringing) can cause the shut-down very quickly, e.g. in FIG. 5a the ring voltage crosses 10 times for a cycle of 2 pulses causing the up-converter to shut down. I.e. the controller 135 is configured to instruct the converter 120 to start lowering the supplied DC voltage when the counter has registered a predetermined number of over-voltage events since the last reset. Counters get cleared any 500 ms without any event. This example is on the one hand very secure, but on the other hand it may cause unnecessary interruption of the ONU, since a cycle of pulses will cumulate over-voltage events quickly.

FIG. 5b illustrates how the unnecessary interruption can be avoided according to an embodiment of the invention. Since it has been discovered that a true or dangerous over-voltage event will persist for a long time, most often for at least 100 ms (e.g. swinging-pulse with equal amplitude active for 100 ms), a way to avoid unnecessary interruption is to clear the counter in case no over-voltage event has been detected during a time period of 2-5 ms, i.e. a predetermined period of time without over-voltage events being chosen from the interval 2-5 ms. Alternatively every 16 ms (20 ms if 50 Hz AC power) a check can be made and if no over-voltage event has been detected for 2-5 ms and if so the counter should be cleared. This would act like a 60 Hz/50 Hz filter which masks the pulses.

FIG. 5c illustrates how the unnecessary interruption can be avoided according to an alternative embodiment of the invention. If the maximum counter value is reached (in this case the max counter value is 5), the DC voltage is dropped from 190V down to a lower value (in this example 165V) to gain more headroom in terms of voltage. This lower value is preferably in the interval of 10-20% lower than the initial value. In this way, subsequent pulses will probably not cross the 200V threshold and cause the counter to increase. If the desire however is to keep the DC voltage at 190V, a check should be made after a certain time has passed since the detection of an over-voltage-event, whereby the DC voltage can be accordingly increased.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. An apparatus for supplying power to a connection device, the apparatus being configured to supply power via wires using DC voltage, the wires having a first conductor and a second conductor, the apparatus comprising:
   a converter configured to increase the DC voltage to be supplied to the wires;
   a detector configured to measure the currents in the first conductor and in the second conductor; and
   a controller configured to:
      detect if a difference between said currents is above a first threshold value; and if so
         instruct the converter to start lowering the supplied DC voltage;
         receive further measurements concerning said currents; and
         decide, within a set period of time since the detection of the difference between said currents being above the first threshold value, if the difference is diminishing faster than a rate threshold value, and if so
         instruct the converter to increase the supplied DC voltage.

2. The apparatus according to claim 1, wherein said detector comprising a sensor resistor for measuring the current in the first conductor and a sensor resistor for measuring the current in the second conductor.

3. The apparatus according to claim 1, wherein the apparatus further comprising an analog/digital converter configured to transform the analog voltage over the sensor resistors to a digital value to be sampled by the controller.

4. The apparatus according to claim 1, wherein the set period of time between the deciding step and said first threshold value was exceeded, is chosen from the interval of 1-10 ms, preferably 5 ms.

5. The apparatus according to claim 1, wherein said first threshold value and a second threshold value are chosen from the interval of 20-30 mA, preferably 25 mA.

6. The apparatus according to claim 1, wherein the detector is further configured to measure the voltages from the first conductor to ground and the second conductor to ground; and wherein the controller is configured to count each time an over-voltage event occurs and to reset the counter after a predetermined period of time without over-voltage events.

7. The apparatus according to claim 6, wherein said predetermined period of time without over-voltage events are set to be in the interval of 2-5 milliseconds.

8. The apparatus according to claim 6, wherein the controller is further configured to instruct the converter to start lowering the supplied DC voltage when the counter has registered a predetermined number of over-voltage events since the last reset.

9. The apparatus according to claim 8, wherein said predetermined number of over-voltage events are set to be 10.

10. The apparatus according to claim 8, wherein the controller is further configured to instruct the converter to supply DC voltage to the wires at a lower voltage for a period of time.

11. The apparatus according to claim 10, wherein the controller is configured to instruct the converter to lower the supplied DC voltage by approximately 10-20%.

12. The apparatus according to claim 6, wherein an over-voltage event is detected if the measured voltage exceeds the supplied voltage plus 10 V.

13. The apparatus according to claim 6, wherein the controller is configured to check 50 or 60 times each second, depending on an AC frequency, if the predetermined period of time without over-voltage events has been exceeded.

14. A method for stabilizing power supply from a Remote Terminal (RT) to a connection device, the power being supplied via wires using DC voltage, the wires having a first conductor and a second conductor, the method comprising:
   measuring the currents in the first conductor and in the second conductor;
   if a difference between said currents is detected as being above a first threshold value;
      start lowering the supplied DC voltage;
      measuring the currents in the first conductor and in the second conductor; and
      deciding, within period of time since the detection of the difference between said currents being above the first threshold value, if the difference is diminishing faster than a rate threshold value, and if so
      increase the supplied DC voltage.

15. The method according to claim 14, and comprising:
   starting an internal power supply, at the connection device, when the DC voltage supplied from the RT is lower than a predetermined value.

16. The method according to claim 15, wherein the intern power supply include capacitors or batteries.

17. The method according to claim 15, wherein the connection device is a telecommunications unit, such as an Optical Network Unit (ONU).

* * * * *

UNITED STATES PATENT AND TRADEMARK OFFICE
CERTIFICATE OF CORRECTION

| | |
|---|---|
| PATENT NO. | : 8,610,418 B2 |
| APPLICATION NO. | : 12/904477 |
| DATED | : December 17, 2013 |
| INVENTOR(S) | : Trojer |

It is certified that error appears in the above-identified patent and that said Letters Patent is hereby corrected as shown below:

In the Drawings:

Replace Sheet 2 of 6 with the attached Sheet 2 of 6.

In the Specification:

In Column 2, Line 40, delete "criteria;" and insert -- criteria. --, therefor.

In Column 5, Line 27, delete "$|I_{out}-|I_{return}|$" and insert -- $|I_{out}-I_{return}|$ --, therefor.

In Column 8, Line 55, delete "so the" and insert -- so, the --, therefor.

In the Claims:

In Column 10, Line 46, in Claim 16, delete "intern" and insert -- internal --, therefor.

Signed and Sealed this
Seventh Day of October, 2014

Michelle K. Lee
*Deputy Director of the United States Patent and Trademark Office*